United States Patent [19]

Masuyama et al.

[11] Patent Number: 5,929,154
[45] Date of Patent: *Jul. 27, 1999

[54] FLAME RETARDED POLYSTYRENIC RESIN COMPOSITION AND MOLDED ARTICLE OF A POLYSTYRENIC RESIN

[75] Inventors: Akitoshi Masuyama; Tohru Iwashita; Shinobu Yamao; Masami Mihara, all of Ichihara, Japan

[73] Assignee: Idemitsu Petrochemical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/793,922

[22] PCT Filed: Jul. 17, 1996

[86] PCT No.: PCT/JP96/01987

§ 371 Date: Apr. 7, 1997

§ 102(e) Date: Apr. 7, 1997

[87] PCT Pub. No.: WO97/04027

PCT Pub. Date: Feb. 6, 1997

[30] Foreign Application Priority Data

Jul. 20, 1995 [JP] Japan .................................. 7-183767

[51] Int. Cl.⁶ ...................................................... C08K 3/10
[52] U.S. Cl. ........................... 524/409; 524/410; 524/411; 524/412; 524/431; 524/432; 524/519
[58] Field of Search ..................................... 524/409, 410, 524/411, 412, 431, 432, 519

[56] References Cited

FOREIGN PATENT DOCUMENTS 0 527 493 A1  2/1993  European Pat. Off. .
0 583 484 A1  2/1994  European Pat. Off. .
1-182349      7/1989  Japan .
3-91549       4/1991  Japan .

OTHER PUBLICATIONS

Patent Abstracts of Japan, vol. 018, No. 687 (E–1651), Dec. 26, 1994.
Database WPI, Derwent Publications Ltd., London, GB; AN 94–216369 XP002056373 & TW 224 479 A (Chi Mei Corp), Jun. 1, 1994.

Primary Examiner—John M. Cooney, Jr.
Attorney, Agent, or Firm—Oblon, Spivak, McClelland, Maier & Neustadt, P.C.

[57] ABSTRACT

A flame retarded polystyrenic resin composition comprising: (A) 100 parts by weight of a resin which comprises (a-1) 1 to 100% by weight of a styrenic polymer having the syndiotactic configuration, (a-2) 0 to 10% by weight of a polymer having compatibility or affinity with component (a-1) and having a polar group, and (a-3) 0 to 99% by weight of a thermoplastic resin and/or a rubbery elastomer other than components (a-1) and (a-2), (B) 2 to 100 parts by weight of a brominated diphenyl compound, (C) 0.5 to 50 parts by weight of at least one compound selected from antimony oxides, sodium antimonate, iron oxides, and zinc oxide, the ratio by weight of component (B) to component (C) being in the range of 1 to 10; a flame retarded polystyrenic resin composition comprising (D) an inorganic filler in addition to the above components; and a molded article of a polystyrenic resin prepared by using the compositions as a material. The flame retarded polystyrenic resin composition has an improved flame retarding property while the proper characteristics of syndiotactic polystyrene such as excellent heat stability, chemical resistance, and mechanical strength are maintained, realizes suppressed generation of gases and decreased attachment of-materials to molds during heat molding, and exhibits excellent heat stability so that the molded product is provided with little change in color and mechanical strength.

6 Claims, No Drawings

FLAME RETARDED POLYSTYRENIC RESIN COMPOSITION AND MOLDED ARTICLE OF A POLYSTYRENIC RESIN

FIELD OF THE INVENTION

The present invention relates to a flame retarded polystyrenic resin composition comprising a styrenic polymer having the syndiotactic configuration as the main component thereof and a molded product prepared by using the resin composition. More particularly, the present invention relates to a flame retarded polystyrenic resin composition having excellent heat stability, water resistance, mechanical strength, and electric insulating property as well as excellent heat stability during molding, and advantageously used as a material of parts in the electric and electronic fields such as connectors, electric parts in the automobile field such as connectors, and other useful parts, and a molded product prepared by using the resin composition.

PRIOR ART OF THE INVENTION

Heretofore, styrenic polymers having the syndiotactic configuration (occasionally referred to as SPS hereinafter) have been used as a material for electric and electronic parts, automobile parts, and machine tool parts because of the excellent mechanical properties, heat resistance, and processability in molding. Particularly in the electric and electronic fields, the level of flame retardation required for materials recently tends to become higher .

As for flame retardation of SPS, flame retardation satisfying UL-94 by Underwriters Laboratory Inc. of USA has been examined by combined use of a flame retardant containing a halogen, such as a brominated polystyrene, or a flame retardant containing phosphorus and an auxiliary flame retardant, such as antimony oxides, as described in the specifications of Japanese Patent Application Laid-Open No. Heisei 2(1990)-92947, Japanese Patent Application Laid-Open No. Heisei 2(1990)-92948, and Japanese Patent Application Laid-Open No. Heisei 5(1993)-247292. The flame retardation by addition of a flame retardant or an auxiliary flame retardant has a problem that the proper mechanical strength of SPS is decreased though the flame retardation of SPS is improved.

The temperature of heat molding of SPS is higher than that of conventional thermoplastic resins because of the proper characteristics of SPS. The temperature of the resin during molding reaches about 300° C. Depending on the conditions of molding, a still higher temperature or a longer retention time in a heated apparatus may be required. Therefore, the above SPS resin compositions containing flame retardants have problems such as decrease in mechanical strength, change in color of molded articles, formation of foams in molded articles by gases generated by decomposition, and deterioration of appearance by burning by gas.

The above SPS resin compositions containing flame retardants have also other problems such as contamination of molds by corrosion of metals by the decomposition products and attachment of materials to the molds, occurrence of incomplete demolding, and contamination of molded articles with foreign substances.

Under the circumstances described above, the present inventors conducted extensive studies to solve the above problems and obtain a flame retarded polystyrenic composition having improved flame retarding property while the excellent proper characteristics of SPS are maintained, realizing suppressed generation of gases and decrease in materials attached to molds during heat molding, and exhibiting excellent heat stability so that a molded product is provided with little change in color and mechanical strength.

SUMMARY OF THE INVENTION

As the result of the above studies, it was discovered that the above problems can be solved by a polystyrenic resin composition obtained by adding specific amounts of a flame retardant having a specific structure and an auxiliary flame retardant having a specific structure to SPS or a resin comprising SPS and resins other than SPS. The present invention has been completed on the basis of the discovery.

The present invention provides a flame retarded polystyrenic resin composition comprising: (A) 100 parts by weight of a resin which comprises (a-1) 1 to 100% by weight of a styrenic polymer having the syndiotactic configuration, (a-2) 0 to 10% by weight of a polymer having compatibility or affinity with component (a-1) and having a polar group, and (a-3) 0 to 99% by weight of a thermoplastic resin and/or a rubbery elastomer other than components (a-1) and (a-2); (B) 2 to 100 parts by weight of a brominated diphenyl compound represented by the following general formula (1):

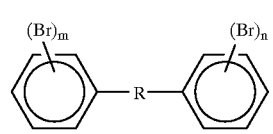

[wherein m and n represent each an integer of 3 to 5 and R represents an alkylene group having 1 to 5 carbon atoms]; and (C) 0.5 to 50 parts by weight of at least one compound selected from antimony oxides, sodium antimonate, iron oxides, and zinc oxide; the ratio by weight of component (B) to component (C) being in the range of 1 to 10. The present invention also provides a flame retarded polystyrenic resin composition comprising (D) 1 to 500 parts by weight of an inorganic filler based on 100 parts by weight of the resin of component (A) in addition to components (A), (B), and (C) described above.

The present invention also provides a molded article of a polystyrenic resin composition prepared by using any of the flame retarded polystyrenic resin compositions described above as a material.

DETAILED DESCRIPTION OF THE INVENTION

The flame retarded polystyrenic resin composition of the present invention is described in more detail in the following.

The resin of component (A) used in the flame retarded polystyrenic resin composition of the present invention comprises (a-1) a styrenic polymer having the syndiotactic configuration as the essential component thereof and at least one of (a-2) a polymer having compatibility or affinity with component (a-1) and having a polar group and (a-3) a thermoplastic resin and/or a rubbery elastomer other than components (a-1) and (a-2) as a preferable component. Therefore, component (A) may comprise one of components (a-2) and (a-3) or both of components (a-2) and (a-3).

The syndiotactic configuration of SPS of component (a-1) means that the stereochemical structure has a highly syndiotactic configuration. In other words, phenyl groups and substituted phenyl groups of the side groups are alternately placed at the opposite positions with respect to the main chain formed with the carbon-carbon bond. The tacticity in the stereochemical structure is quantitated by the measurement of the nuclear magnetic resonance using an isotope of carbon ($^{13}$C-NMR). The tacticity measured by the $^{13}$C-NMR method can show the content of a sequence in which a specific number of the constituting units are bonded in sequence, such as a diad in which two constituting units are bonded in sequence, a triad in which three constituting units are bonded in sequence, and a pentad in which five constituting units are bonded in sequence. In the present invention, "the styrenic (co)polymer having a highly syndiotactic configuration" means polystyrene, a poly(alkylstyrene), a poly(halogenated styrene), a poly(halogenated alkylstyrene), a poly(alkoxystyrene), a poly(vinylbenzoic acid ester), a hydrogenation product of these polymers, a mixture of these polymers, or a copolymer containing constituting units of these polymers as the main components, which generally has a syndiotacticity of 75% or more, preferably 85% or more, expressed in terms of the content of the racemic diad, or 30% or more, preferably 50% or more, expressed in terms of the content of the racemic pentad.

Examples of the poly(alkylstyrene) include poly (methystyrene), poly(ethylstyrene), poly(isopropylstyrene), poly(tertiary-butylstyrene), poly(phenylstyrene), and poly(vinylstyrene). Examples of the poly(halogenated styrene) include poly(chlorostyrene), poly(bromostyrene), and poly(fluorostyrene). Examples of the poly(halogenated alkylstyrene) include poly(chloromethylstyrene). Examples of the poly(alkoxystyrene) include poly(methoxystyrene) and poly(ethoxystyrene).

Preferable examples of the styrenic polymers among SPS described above are polystyrene, poly(p-methylstyrene), Poly(m-methylstyrene), poly(p-tertiary-butylstyrene), poly(p-chlorostyrene), poly(m-chlorostyrene), poly(p-fluorostyrene), hydrogenated polystyrene, and copolymers containing constituting units of these polymers.

The styrenic polymers described above may be used singly or as a combination two or more types.

The molecular weight of SPS is not particularly limited. A styrenic polymer having a weight-average molecular weight preferably of 10,000 or more, more preferably of 50,000 or more, can be used. A styrenic polymer having a weight-average molecular weight of less than 10,000 is not preferable because thermal properties and physical properties such as mechanical strength of the composition or the molded article are sometimes decreased.

The molecular weight distribution is not particularly limited, and styrenic polymers having various molecular weight distribution can be used.

SPS described above can be produced by polymerizing a styrenic monomer (a monomer corresponding to the repeating unit in SPS described above) in an inert hydrocarbon solvent or in the absence of a solvent by using a combination of a titanium compound and a condensation product of water and trialkylaluminum as the catalyst (Japanese Patent Application Laid-Open No. Showa 62(1987)-187708). The poly (halogenated alkylpolystyrene) described above can be obtained in accordance with the method described in Japanese Patent Application Laid-Open No. Heisei 1(1989)-46912. The hydrogenated polymer described above can be obtained in accordance with the method described in Japanese Patent Application Laid-Open No. Heisei 1(1989)-178505.

Component (a-2) comprised in component (A) of the resin composition of the present invention is a polymer having compatibility or affinity with component (a-1) and having a polar group. This means that the polymer has a sequence of units showing compatibility or affinity with component (a-1) in the polymer chain. For example, the polymer has syndiotactic polystyrene, atactic polystyrene, isotactic polystyrene, a styrenic polymer, polyphenylene ether, or polyvinyl methyl ether as the main chain, block chains, or grafted chains.

The polar group in the polymer of component (a-2) is not particularly limited as long as the polar group can increase adhesion with the inorganic filler described above. Specific examples of the polar group include acid anhydride groups, carboxylic acid groups, carboxylic acid ester groups, carboxylic acid halide groups, carboxylic acid amide groups, carboxylic acid salt groups, sulfonic acid group, sulfonic acid ester groups, sulfonic acid chloride group, sulfonic acid amide groups, sulfonic acid salt groups, epoxy group, amino group, imide group, and oxazoline group.

Specific examples of component (a-2) include modified styrenic polymers, such as styrene-maleic anhydride copolymer (SMA), styreneglycidyl methacrylate copolymer, polystyrenes modified with carboxylic acids at the ends, polystyrenes modified with epoxy group at the ends, polystyrenes modified with oxazoline group at the ends, polystyrenes modified with amine group at the ends, sulfonated polystyrenes, styrenic ionomers, styrene-methyl methacrylate graft polymers, (styrene-glycidyl methacrylate)-methyl methacrylate graft copolymers, acrylate-styrene graft polymers modified with acids, (styrene-glycidyl methacrylate)-styrene graft polymers, polybutylene terephthalate-polystyrene graft polymers, SPS modified with maleic anhydride, SPS modified with fumaric acid, SPS modified with glycidyl methacrylate, and SPS modified with amines; and modified polyphenylene ether polymers, such as (styrene-maleic anhydride)-polyphenylene ether graft polymers, polyphenylene ethers modified with maleic anhydride, polyphenylene ethers modified with fumaric acid, polyphenylene ethers modified with glycidyl methacrylate, and polyphenylene ethers modified with amines. Among these polymers, modified polyphenylene ethers and modified SPS are particularly preferable.

The polymers described above may be used singly or as a combination of two or more types.

The modified polyphenylene ether as one of component (a-2) is a polymer obtained by modifying a polyphenylene ether, such as those shown in the following, with a modifier. The method of modification is not limited as long as the object of the invention can be achieved.

The polyphenylene ethers are known compounds, and may be referred, for example, to the specifications of U.S. Pat. Nos. 3,306,874, 3,306,875, 3,257,357, and 3,257,358. The polyphenylene ethers are generally prepared by an oxidative coupling reaction forming a homopolymer or a copolymer in the presence of a copper-amine complex and one or more types of di- or tri-substituted phenol. As the copper-amine complex, a copper-amine complex derived from a primary, secondary, or tertiary amine can be used.

Specific examples of the polyphenylene ether include: poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl- 1,4-phenylene ether), and poly(2,6-dimethyl-1,4-phenylene ether).

Examples of the polyphenylene ether also include copolymers derived from two or more types of phenol compound used for preparation of the above homopolymers. Further examples of the polyphenylene ether include graft copolymers and block copolymers of vinylaromatic compounds such as polystyrene and the polyphenylene ethers described above.

Among various types of the polyphenylene ether described above, poly(2,6-dimethyl-1,4-phenylene ether) is particularly preferably used.

As the modifier used for modifying the polyphenylene ethers, compounds having an ethylenic double bond and a polar group in the same molecule can be used. Specific examples of the modifier include derivatives of maleic acid, such as maleic anhydride, maleic acid, esters of maleic acid, maleimides, N-substituted maleimides, and salts of maleic acid; derivatives of fumaric acid, such as fumaric acid, esters of fumaric acid, and salts of fumaric acid; derivatives of itaconic acid, such as itaconic anhydride, itaconic acid, esters of itaconic acid, and salts of itaconic acid; derivatives of acrylic acid, such as acrylic acid, esters of acrylic acid, amides of acrylic acid, and salts of acrylic acid; and derivatives of methacrylic acid, such as methacrylic acid, esters of methacrylic acid, amides of methacrylic acid, salts of methacrylic acid, and glycidyl methacrylate. Among these modifiers, maleic anhydride, fumaric acid, and glycidyl methacrylate are particularly preferably used. The modifier described above may be used singly or as a combination of two or more types.

The modified polyphenylene ether of component (a-2) can be obtained, for example, by the reaction of the polyphenylene ether described above and the modifier also described above in the presence of a solvent or other resins. The process for the modification is not particularly limited, and a conventional process, such as a process in which the reaction is conducted by melt kneading using a roll mill, a Banbury mixer, or an extruder at a temperature in the range of 150 to 350° C., and a process in which the reaction is conducted by heating in a solvent such as benzene, toluene, or xylene, may be used. It is effective for facilitating the reaction that a radical generator, such as benzoyl peroxide, di-t-butyl peroxide, dicumyl peroxide, t-butyl peroxybenzoate, azobisisobutyronitrile, azobisisovaleronitrile, and 2,3-diphenyl-2,3-dimethylbutane, is present.

Among these polyphenylene ethers, polyphenylene ether modified with maleic anhydride, polyphenylene ether modified with fumaric acid, and polyphenylene ether modified with glycidyl methacrylate are particularly preferably used.

In the resin composition of the present invention, a modified SPS having a polar group may also be used as component (a-2). This modified SPS can be obtained, for example, by modifying SPS described above as component (a-1) with a modifier. However, the process for obtaining the modified SPS is not limited to this process but other processes may be used as long as the obtained modified SPS can be used for achieving the object of the present invention.

SPS used for the modification is not particularly limited, and the polymers described above as component (a-1) can be used. Homopolymer of styrene and copolymers of styrene and substituted styrenes are preferably used because of superior compatibility with other components. The composition of the copolymer is not particularly limited, and the content of the unit of the substituted styrene is preferably 50% by mol or less. When the content is more than 50% by mol, the compatibility with other components decreases, and accordingly such a content is not preferable. Examples of the particularly preferable substituted styrene include alkylstyrenes, such as methylstyrene, ethylstyrene, isopropylstyrene, tertiary-butylstyrene, and vinylstyrene; halogenated styrenes, such as chlorostyrene, bromostyrene, and fluorostyrene; halogenated alkylstyrenes, such as chloromethylstyrene; and alkoxystyrenes, such as methoxystyrene and ethoxystyrene. The substituted styrene may be used singly or as a combination of two or more types.

As the modifier used for modifying SPS, compounds having an ethylenic double bond and a polar group in the same molecule can be used. Specific examples of the modifier include derivatives of maleic acid, such as maleic anhydride, maleic acid, esters of maleic acid, maleimides, N-substituted maleimides, and salts of maleic acid; derivatives of fumaric acid, such as fumaric acid, esters of fumaric acid, and salts of fumaric acid; derivatives of itaconic acid, such as itaconic anhydride, itaconic acid, esters of itaconic acid, and salts of itaconic acid; derivatives of acrylic acid, such as acrylic acid, esters of acrylic acid, amides of acrylic acid, and salts of acrylic acid; and derivatives of methacrylic acid, such as methacrylic acid, esters of methacrylic acid, amides of methacrylic acid, salts of methacrylic acid, and glycidyl methacrylate. Among these modifiers, maleic anhydride, fumaric acid, and glycidyl methacrylate are particularly preferably used. The modifiers described above may be used singly or as a combination of two or more types.

The modified SPS can be obtained, for example, by the reaction of SPS described above and the modifier also described above in the presence of a solvent or other resins. The process for the modification is not particularly limited, and a conventional process, such as a process in which the reaction is conducted by melt kneading using a roll mill, a Banbury mixer, or an extruder at a temperature in the range of 150 to 350° C., and a process in which the reaction is conducted by heating in a solvent such as benzene, toluene, or xylene, may be used. It is effective for facilitating the reaction that a radical generator, such as benzoyl peroxide, di-t-butyl peroxide, dicumyl peroxide, t-butyl peroxybenzoate, azobisisobutyronitrile, azobisisovaleronitrile, and 2,3-diphenyl-2,3-dimethylbutane, is present.

Among these modified SPS, SPS modified with maleic anhydride, SPS modified with fumaric acid, and SPS modified with glycidyl methacrylate are particularly preferably used.

Component (a-2) may be used singly or as a combination of two or more types. The content of the polar group in component (a-2) is preferably in the range of 0.01 to 20% by weight, more preferably in the range of 0.05 to 10% by weight. When the content is less than 0.1% by weight, a large amount of component (a-2) must be used for exhibiting the effect as the compatibilizer to cause decrease in the physical properties and heat resistance of the composition. When the content is more than 20% by weight, the compatibility with component (a-1) is inferior. Accordingly, such a content is not preferable.

The content of component (a-2) in the resin of component (A) is selected in the range of 0 to 10% by weight, preferably in the range of 0 to 8% by weight, based on the total weight of the resin of component (A). When the content is more than 10% by weight, the composition has inferior heat resistance and processability in molding, and accordingly such a content is not preferable.

As component (a-3) used in component (A) of the resin composition of the present invention, a thermoplastic resin and/or a rubbery elastomer can be used. As the thermoplastic resin in component (a-3), various types of thermoplastic resin can be used without particular limitation as long as the thermoplastic resins are other than those used as component (a-2) or (a-3).

Specific examples of the thermoplastic resin described above include styrenic resins, such as polystyrene having the atactic configuration, polystyrene having the isotactic configuration, AS resins, and ABS resins; polyester resins, such as polyethylene terephthalate, polyethylene naphthalate, and polycarbonates; poly(thio)ether resins, such as polyphenylene ether, polyphenylene sulfide, and polyoxymethylene; sulfone resins, such as polysulfones and polyether sulfones; acrylic polymers, such as polyacrylic acid, polyacrylic esters, and polymethyl methacrylate; olefinic polymers, such as polyethylene, polypropylene, polybutene, poly-4-methylpentene-1, and ethylene-propylene copolymers; polymers of vinyl compounds containing halogen, such as polyvinyl chloride, polyvinylidene chloride, and polyvinylidene fluoride; and polyamide resins, such as polyamide-6, polyamide-4,6, and polyamide-6,6.

Examples of the rubbery elastomer in component (a-3) include natural rubber, polybutadiene, polyisoprene, polyisobutylene, neoprene, polysulfide rubbers, thiokol rubbers, acrylic rubbers, urethane rubbers, silicone rubbers, epichlorohydrin rubbers, styrene-butadiene block copolymers (SBR), hydrogenated styrene-butadiene block copolymers (SEB), styrene-butadiene-styrene block copolymers (SBS), hydrogenated styrene-butadiene-styrene block copolymers (SEBS), styrene-isoprene block copolymers (SIR), hydrogenated styrene-isoprene block copolymers (SEP), styrene-isoprene-styrene block copolymers (SIS), hydrogenated styrene-isoprene-styrene block copolymers (SEPS), styrene-butadiene random copolymers, hydrogenated styrene-butadiene random copolymers, styrene-butadiene-propylene random copolymers, styrene-ethylene-butylene random copolymers, ethylene-propylene rubbers (EPR), ethylene-propylene-diene rubbers (EPDM), and particulate elastomers of core-shell types, such as butadiene-acrylonitrile-styrene core-shell rubbers (ABS), methyl methacrylate-butadiene-styrene core-shell rubbers (MBS), methyl methacrylate-butyl acrylate-styrene core-shell rubbers (MAS), octyl acrylate-butadiene-styrene core-shell rubbers (MABS), alkyl acrylate-butadiene-acrylonitrile-styrene core-shell rubbers (AABS), butadiene-styrene core-shell rubbers (SBR), core-shell rubbers containing siloxanes such as methyl methacrylate-butyl acrylate siloxane.

Among the above rubbery elastomers, SBR, SBS, SEB, SEBS, SIR, SEP, SIS, SEPS, and core-shell rubbers are particularly preferably used.

Examples of the modified rubbery elastomer used as component (a-3) include rubbers obtained by modifying styrene-butyl acrylate copolymer rubbers, styrene-butadiene block copolymers (SBR), hydrogenated styrene-butadiene block copolymers (SEB), styrene-butadiene-styrene block copolymers (SBS), hydrogenated styrene-butadiene-styrene block copolymers (SEBS), styrene-isoprene block copolymers (SIR), hydrogenated styrene-isoprene copolymers (SEP), styrene-isoprene-styrene block copolymers (SIS), hydrogenated styrene-isoprene-styrene block copolymers (SEPS), styrene-butadiene random copolymers, hydrogenated styrene-butadiene random copolymers, styrene-ethylene-propylene random copolymers, styrene-ethylene-butylene random copolymers, ethylene-propylene rubbers (EPR), and ethylene-propylene-diene rubbers (EPDM) with a modifier having a polar group.

Among the above modified rubbery elastomers, rubbers obtained by modifying SEB, SEBS, SEP, SEPS, EPR, and EPDM are preferably used. Specific examples of the preferable modified rubbery elastomer include SEBS modified with maleic anhydride, SEPS modified with maleic anhydride, EPR modified with maleic anhydride, EPDM modified with maleic anhydride, SEBS modified with epoxy group, and SEPS modified with epoxy group.

The thermoplastic resin and rubbery elastomer of component (a-3) may be used singly or as a combination of two or more types. When a combination of the thermoplastic resins and the rubbery elastomers are used, one or more types selected from each of the thermoplastic resins and the rubbery elastomers as desired can be used for the combination.

The content of component (a-3) in component (A) is selected in the range of 0 to 99% by weight, preferably 0 to 90% by weight, more preferably 0 to 80% by weight, based on the total weight of the resin of component (A). When the content is more than 99% by weight, a problem arises in that the excellent characteristics of SPS of component (a-1), such as excellent mechanical strength and heat resistance, are not sufficiently exhibited.

Component (B) and component (C) used in the flame retarded polystyrenic resin composition of the present invention are described in the following.

The brominated diphenyl compound of component (B) of the present invention is represented by the following general formula (1):

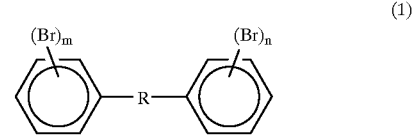

In the general formula, m and n represent each an integer of 3 to 5, preferably 4 or 5. R represents an alkylene group having 1 to 5 carbon atoms, preferably 1 to 3 carbon atoms. Particularly preferably, R represents methylene group having one carbon atom or ethylene group having two carbon atoms.

Specific examples of the brominated diphenyl compound which is used as the flame retardant include di(pentabromophenyl)methane, di(tetrabromophenyl)methane, di(tribromophenyl)methane, 1,2-di(pentabromophenyl)ethane, 1,2-di(tetrabromophenyl)ethane, and 1,2-di(tribromophenyl)ethane.

Among these compounds, di(pentabromophenyl)methane and 1,2-di(pentabromophenyl)ethane are preferably used. These compounds are more preferably in the form of particles having an average diameter of 10 μm or less.

The amount of component (B) used in the resin composition is 2 to 100 parts by weight, preferably 5 to 90 parts by weight, more preferably 5 to 80 parts by weight, based on 100 parts by weight of component (A). When the amount is less than 1 part by weight, the flame retarding effect is not sufficiently exhibited. When the amount is more than 100 parts by weight, problems such as decrease in the mechanical strength, increase in specific gravity, and inferior appearance arise.

Component (C) used as the auxiliary flame retardant in the flame retarded polystyrenic resin composition of the present invention is at least one type of compound selected from antimony oxides, sodium antimonate, iron oxides, and zinc oxide. Specific examples of the compound include antimony oxides such as antimony trioxide and antimony pentaoxide, sodium antimonate, ferric oxide, and zinc oxide. Among these compounds, antimony oxides such as antimony trioxide and antimony pentaoxide and sodium antimonate are preferable because resin compositions having excellent flame retarding property can be obtained.

For providing a still more excellent flame retarding property to the resin composition, the average particle size of component (C) is generally 0.01 to 10 µm, preferably 0.05 to 8 µm, more preferably 0.1 to 5 µm. When the particle size is smaller than 0.01 µm, handling of the compound becomes difficult. When the particle size is larger than 10 µm, the flame retarding property is inferior. Accordingly, such a particle size is not preferable.

The amount of component (C) used in the resin composition is 0.5 to 50 parts by weight, preferably 1 to 40 parts by weight, based on 100 parts by weight of component (A). When the amount of component (C) is less than 0.5 part by weight, the flame retarding property of the resin composition is not sufficient. When the amount is more than 50 parts by weight, problems such as decrease in the mechanical strength and inferior appearance of the obtained resin composition arise. The above compound may be used as the auxiliary flame retardant of component (C) singly or as a combination of two or more types.

In the present invention, the ratio by weight of component (B) to component (C) [(B)/(C)] is in the range of 1 to 10, preferably in the range of 2 to 8. When the ratio by weight is less than 1 or more than 10, a resin composition having a sufficient flame retarding property cannot be obtained.

In the present invention, the above resin composition may additionally comprise an inorganic filler as component (D) where necessary. The amount of component (D) comprised in the resin composition is generally 1 to 500 parts by weight, preferably 1 to 350 parts by weight, more preferably 5 to 200 parts by weight, based on 100 parts by weight of component (A).

The inorganic filler of component (D) may have various shapes such as fibers, particles, and powder. Examples of the material having the shape of fibers and used as the inorganic filler include glass fibers, carbon fibers, wiskers, ceramic fibers, and metal fibers. More specific examples include wiskers, such as boron wiskers, alumina wiskers, silica wiskers, and silicon carbide wiskers; ceramic fibers, such as gypsum fibers, potassium titanate fibers, magnesium sulfate fibers, and magnesium oxide fibers; and metal fibers, such as copper fibers, aluminum fibers, and steel fibers.

The inorganic filler having the shape of fibers can be used in various forms, such as a cloth, a mat, cut bundles, short fibers, and filaments as well as directly in the form of wiskers. When the inorganic filler is used in the form of a cloth or a mat, the length is preferably 1 mm or more, more preferably 5 mm or more. When the inorganic filler is used in the form of cut bundles, the length is preferably 0.05 to 50 mm, and the diameter of the fiber is preferably 5 to 20 µm.

Examples of the material having the shape of particles or powder and used as the inorganic filler include particles and powders of talc, carbon black, graphite, titanium dioxide, silica, mica, calcium carbonate, calcium sulfate, barium carbonate, magnesium carbonate, magnesium sulfate, barium sulfate, tin oxides, alumina, kaolin, silicon carbide, metals, and glasses. Among these materials, glass materials are preferable. In view of the shape, glass filaments, glass fibers, glass robings, glass mats, glass powders, glass flakes, and glass beads are preferable.

The inorganic fillers of component (D) described above in detail may be used singly or as a combination of two or more types.

As the inorganic filler of component (D) described above, inorganic filler treated with a coupling agent on the surface to increase adhesion w i t h SPS of component (a-1) in component (A) is preferably used. As the coupling agent, for example, silane coupling agents and titanium coupling agents are used. Specific examples of the silane coupling agent include triethoxysilane, vinyltris(β-methoxyethoxy) silane, γ-methacryloxypropyltrimethoxysilane, γ-glycidoxypropyltrimethoxysilane, β-(1,1-epoxycyclohexyl)ethyltrimethoxysilane, N-β-(aminoethyl)-γ-aminopropyltrimethoxysilane, N-β-(aminoethyl)-γ-aminopropylmethyl-dimethoxysilane, γ-aminopropyltriethoxysilane, N-phenyl-γ-aminopropyltrimethoxysilane, γ-mercaptopropyltrimethoxysilane, γ-chloropropyltrimethoxysilane, γ-aminopropyltrimethoxysilane, γ-aminopropyl-tris(2-methoxyethoxy)silane, N-methyl-γ-aminopropyl-trimethoxysilane, N-vinylbenzyl-γ-aminopropyltriethoxysilane, triaminopropyltrimethoxysilane, 3-ureydopropyltrimethoxysilane, 3-4,5-dihydroimidazolepropyltriethoxysilane, hexamethyldisilazane, N,O-(bistrimethylsilyl)amide, and N,N-bis(trimethylsilyl)urea. Among these compounds, aminosilanes and epoxysilanes, such as γ-aminopropyltrimethoxysilane, N-β-(aminoethyl)-γ-aminopropyl-trimethoxysilane, and β-(3,4-epoxycyclohexyl)ethyltrimethoxysilane, are preferable.

Specific examples of the titanium coupling agent include isopropyl triisostearoyl titanate, isopropyl tridodecylbenzenesulfonyl titanate, isopropyl tris(dioctylpyrophosphate) titanate, tetraisopropyl bis(dioctyl phosphite) titanate, tetraoctyl bis(ditridecyl phosphite) titanate, tetra(1,1-diallyloxymethyl-1-butyl) bis(ditridecyl) phosphite titanate, bis(dioctyl-pyrophosphate)oxy acetate titanate, bis (dioctylpyrophosphate) ethylene titanate, isopropyl trioctanoyl titanate, isopropyl dimethacryl isostearoyl titanate, isopropyl isostearoyl diacryl titanate, isopropyl tri(dioctyl phosphate) titanate, isopropyl tricumyl phenyl titanate, isopropyl tri(N-amidoethyl, aminoethyl) titanate, dicumyl phenyloxy acetate titanate, and diisostearoyl ethylene titanate. Among these compounds, isopropyl tri(N-amidoethyl, aminoethyl) titanate is preferable.

The surface treatment of the filler described above by using the coupling agent can be conducted by a conventional method. The method of the surface treatment of the inorganic filler used in the present invention is not particularly limited. The surface treatment can be conducted by a suitable process in accordance with the shape of the filler. Examples of the process include the sizing treatment comprising coating the inorganic filler with a sizing agent which is a solution of the above coupling agent in an organic solvent or a suspension of the above coupling agent, the dry mixing process using a Henschel mixer, a super mixer, a Redige mixer, or a V-blender, the spraying process, the integral blending process, and the dry concentrate process. Among the above processes, the sizing treatment, the dry mixing process, and the spraying process are preferable.

A film forming material for glass may additionally be used in combination with the coupling agent described above. The film forming material for glass is not particularly limited. Examples of the film forming material for glass include polyester polymers, urethane polymers, epoxy polymers, acrylic polymers, vinyl acetate polymers, and polyether polymers.

An organic filler may additionally be used in combination with the inorganic filler of component (D). As the organic filler, organic synthetic fibers and natural plant fibers are used. Examples of the organic synthetic fiber include total aromatic polyamide fibers and polyimide fibers.

In the flame retarded polystyrenic resin of the present invention, a compound having the property of supplementing the function of the free halogen of the halogen flame retardants may additionally be used where necessary for improving the heat stability during the molding and the heat resistance and the weathering (light) resistance during the application within the range that the object of the invention is not adversely affected. Examples of the above compound include metal hydroxides, such as calcium hydroxide and magnesium hydroxide, compounds analogous to hydrotalcite, compounds obtained from the compounds analogous to hydrotalcite by substitution with zinc, lithium aluminum complex hydroxide salt, crystalline zeolite, amorphous zeolite, boric acid, boric acid anhydride, and metal salts of boric acid. Among these compounds, magnesium hydroxide, compounds analogous to hydrotalcite, compounds obtained from the compounds analogous to hydrotalcite by substitution with zinc, and lithium aluminum complex hydroxide salt are preferable.

Moreover, in the flame retarded polystyrenic resin composition of the present invention, various additives, such as antioxidants, ultraviolet light absorbents, light stabilizers, lubricants, plasticizers, nucleating agents, mold releases, antistatic agents, foaming agents, and coloring agents, may additionally be used.

The flame retarded polystyrenic resin composition of the present invention can be obtained by mixing the components described above in the relative amounts also described above. The method of mixing is not particularly limited, and the conditions of mixing such as the order of addition and the method of mixing can be decided as desired. The resin composition includes compositions obtained by melt kneading the mixtures which are obtained by mixing the components. The compositions obtained by melt kneading the mixtures are more suitable as the material for molding than materials obtained directly by mixing without melt kneading. The method of melt kneading is not particularly limited, and a conventional method can be used.

The flame retarded polystyrenic resin composition of the present invention can be used as a material of a molded article of the resin. The molded article of polystyrenic resin obtained by using the resin composition of the present invention shows very small change in the physical properties after being used for a long time at a high temperature under an ordinary atmosphere.

The molded article of the polystyrenic resin of the present invention can be obtained by molding the flame retarded polystyrenic resin composition described above in accordance with various generally known processes of plastic molding, such as the injection molding, the extrusion molding, and the blow molding. The process and the conditions of the molding are not particularly limited, and suitably decided in accordance with the composition of the above resin composition and the type of the article to be produced.

The flame retarded polystyrenic resin composition and the molded article of the polystyrenic resin of the present invention show the following advantages in the industrial application.

The flame retarded polystyrenic resin composition of the present invention shows excellent flame retarding property while the proper characteristics of SPS, such as heat resistance, chemical resistance, impact resistance, and mechanical strength, are maintained, and provides molded articles having excellent heat stability with little change in color and mechanical strength. The flame retarded polystyrenic resin composition of the present invention also realizes suppressed generation of gases and decreased attachment of materials to molds during heat molding as well as improved fluidity of the resin composition during the molding.

Therefore, the flame retarding polystyrenic resin composition of the present invention can advantageously be used, for example, as the material for molded articles when a relatively high molding temperature and a relatively long retention time are required. More specifically, a wide area of application can be found in the field of molded articles which require a low specific gravity, a high strength, a high heat resistance, a low permittivity, and a high durability. The resin composition can particularly advantageously be used in the field of electric and electronic parts, mechanical parts, and various types of connector which require heat resistance.

The present invention is described in more detail with reference to examples and comparative examples in the following.

Trade names, chemical names, and names of production companies of the flame retardants and the auxiliary flame retardant, bromine contents of the flame retardants, and the average particle diameter of the auxiliary flame retardant, which were used in the examples and comparative examples, are listed in the following.

[Flame retardant]
(1) SAYTEX 8010: 1,2-di(pentabromophenyl)ethane [a product of Ethyl Corporation; bromine content: 82% by weight]
(2) FIRE GUARD 7000: an oligomer (7-mer) of tetrabromobisphenol A [a product of Teijin Kasei Co., Ltd.; bromine content: 51% by weight]
(3) PYRO-CHEK 68PBC: a brominated polystyrene [a product of Fero Corporation; bromine content: 67% by weight]
(4) PO-64P: a brominated polyphenylene ether [a product of Great Lakes Corporation; bromine content: 62% by weight]

[Auxiliary flame retardant]
(1) ATOX-S: antimony trioxide [a product of Nippon Seiko Co., Ltd.; average particle diameter: 0.5 $\mu$m]

The following properties were measured with test pieces obtained in the examples and the comparative examples described later in accordance with the following methods to examine the mechanical properties, the retention stability, and the flammability.

(1) Mechanical properties
 (1-1) Bending strength and bending modulus: in accordance with the method of Japanese Industrial Standard K7203
 (1-2) Izod impact strength: in accordance with the method of Japanese Industrial Standard K7110
 (1-3) Heat deformation temperature: in accordance with the method of Japanese Industrial Standard K7207

(2) Retention stability

Molded articles having a length of 80 mm, a width of 40 mm, and a thickness of 2.0 mm were prepared by using an injection molding machine (a product of Toshiba Kikai Co., Ltd.; IS25EP) at a cylinder temperature of 280° C., an injection time of 10 seconds, and cooling times of 20 seconds and 300 seconds. The degree of change in color was visually observed with the molded articles prepared under the cooling times of 20 seconds and 300 seconds and evaluated in accordance with the following criterion (the shot number during the retention in the cylinder was 5):

⊚: no change in color

◯: slight change in color

Δ: moderate change in color x: significant change in color

The prepared molded articles were pulverized by a pulverizer to form fine powder, and melt index (MI) was measured by using the obtained powder in accordance with the method of Japanese Industrial Standard K-7210 (the temperature and the load of the test as listed in the tables). A larger value of MI of the molded article cooled for 20 seconds showed a superior degree of fluidity, viz. a superior processability. A smaller difference between MI of the molded article cooled for 300 seconds and MI of the molded article cooled for 20 seconds showed a superior degree of retention stability. The degree of burning and the amount of foreign substances were visually observed with the molded article cooled for 300 seconds.

(3) Flammability

The flammability test was conducted in accordance with the method of Subject 94 by the Underwriters Laboratory Inc. of USA (referred to as UL-94 hereinafter) by using 5 test pieces having a length of 5 inches, a width of ½ inch, and a thickness of 1/32 inch. The test result was evaluated by classifying the result into one of V-0, V-1, V-2, and HB grades. The grades except for the HB grade show a sufficient flame retarding property for practical applications.

PREPARATION EXAMPLE 1 (Preparation of SPS)

A glass vessel having an inner volume of 500 ml and purged with argon was charged with 17.8 g (71 mmol) of copper sulfate pentahydrate ($CuSO_4.5H_2O$), 200 ml of toluene, and 24 ml (250 mmol) of trimethylaluminum. The resultant mixture was allowed to react at 40° C. for 8 hours. The solid parts were removed from the reaction product, and toluene was removed from the resultant solution at a room temperature by distillation under a reduced pressure to obtain 6.7 g of a catalyst product. The molecular weight of the catalyst product measured by the freezing point depression was 610.

Then, a reaction vessel having an inner volume of 2 liter was charged with 1 liter of purified styrene, the catalyst product obtained above in an amount containing 7.5 mmol of aluminum atom, 7.5 mmol of triisobutylaluminum, and 0.038 mmol of pentamethylcyclopentadienyl trimethoxide. The polymerization of styrene was conducted at 90° C. for 5 hours. After the reaction was finished, the product was treated with a methanol solution of sodium hydroxide for decomposition of the catalyst, repeatedly washed with methanol, and dried to obtain 466 g of a polymer.

The weight-average molecular weight of the obtained polymer was measured by the gel permeation chromatography using 1,2,4-trichlorobenzene at 130° C., and was found to be 290,000. The ratio of the weight-average molecular weight/the number-average molecular weight was 2.72. It was confirmed by the measurements of the melting point and the $^{13}C$-NMR that the obtained polymer was a polystyrene having the syndiotactic configuration (SPS).

PREPARATION EXAMPLE 2 (Preparation of polyphenylene ether modified with maleic anhydride)

Polyphenylene ether (inherent viscosity, 0.47 dl/g in chloroform at 25° C.) in an amount of 1 kg, 60 g of maleic anhydride, and 10 g of 2,3-dimethyl-2,3-diphenylbutane (a product of Nippon Yushi Co., Ltd.; Nofmer BC, a trade name) as the radical generator were dry blended. The resultant blend was melt kneaded by using a 30 mm twin screw extruder at a rotation of screw of 200 rpm and a set temperature of 300° C. The temperature of the resin was about 330° C. during this operation. The obtained strands were cooled and pelletized to obtain polyphenylene ether modified with maleic anhydride. For the measurement of the degree of modification, 1 g of the obtained polyphenylene ether modified with maleic anhydride was dissolved in ethylbenzene and reprecipitated with methanol. The recovered polymer was extracted with methanol with a Soxhlet extractor and dried. The degree of modification was obtained from the intensity of carbonyl group by the measurement of the IR spectrum and also by titration and found to be 2.0% by weight.

PREPARATION EXAMPLE 3 (Preparation of polyphenylene ether modified with fumaric acid)

Polyphenylene ether (inherent viscosity, 0.47 dl/g in chloroform at 25° C.) in an amount of 1 kg, 60 g of fumaric acid, and 10 g of 2,3-dimethyl-2,3-diphenylbutane (a product of Nippon Yushi Co., Ltd.; Nofmer BC, a trade name) as the radical generator were dry blended. The resultant blend was melt kneaded by using a 30 mm twin screw extruder at a rotation of screw of 200 rpm and a set temperature of 300° C. The temperature of the resin was about 330° C. during this operation. The obtained strands were cooled and pelletized to obtain polyphenylene ether modified with fumaric acid. For the measurement of the degree of modification, 1 g of the obtained polyphenylene ether modified with fumaric acid was dissolved in ethylbenzene and reprecipitated with methanol. The recovered polymer was extracted with methanol with a Soxhlet extractor and dried. The degree of modification was obtained from the intensity of carbonyl group by the measurement of the IR spectrum and also by titration and found to be 1.7% by weight.

EXAMPLE 1

To 100 parts by weight of mixture A which contained 90% by weight of SPS obtained in Preparation Example 1 and 10% by weight of SEBS (a product of Shell Chemical Company; Crayton G-1651), 20.0 parts by weight of SAY-TEX 8010 as the flame retardant, and 6.7 parts by weight of ATOX-S as the auxiliary flame retardant were added. The obtained mixture was dry blended by using a Henschel mixer and then melt kneaded by using a twin screw extruder (a product of Toshiba Kikai Co., Ltd.; TEM-35) at a set cylinder temperature of 280° C. The obtained mixture was pelletized.

From the obtained pellets, test pieces were prepared by using an injection molding machine (a product of Toshiba Kikai Co., Ltd.; IS55FPA) at a cylinder temperature of 290° C., an injection time of 10 seconds, and a cooling time of 20 seconds and evaluated with respect to bending strength, bending modulus, Izod impact strength, heat deformation temperature, MI, and flammability. After the retention test of the resin composition, the molded article was evaluated with respect to MI, change in color, burning, and foreign substances.

The results are shown in Table 1.

EXAMPLE 2

A resin composition was prepared, molded, and evaluated in accordance with the same procedures as those in Example 1 except that 4.0 parts by weight of ATOX-S was added in place of 6.7 parts by weight of ATOX-S.

The results are shown in Table 1.

As can be understood from the above results, resin compositions having excellent flame retarding property, mechanical properties, and heat stability during heat molding could be obtained by addition of the specific relative amounts of SAYTEX 8010 as the flame retardant and ATOX-S as the auxiliary flame retardant.

EXAMPLE 3

A resin composition was prepared, molded, and evaluated in accordance with the same procedures as those in Example 1 except that 1.0 part by weight of a compound analogous to hydrotalcite (a product of Kyowa Hakko Kagaku Co., Ltd.; DHT-4A) was used in addition to 20.0 parts by weight of SAYTEX 8010 and 6.7 parts by weight of ATOX-S.

The results are shown in Table 1.

As can be understood from the above results, a resin composition having still more excellent heat stability during heat molding could be obtained by the additional use of DHT-4A.

COMPARATIVE EXAMPLE 1

A resin composition was prepared, molded, and evaluated in accordance with the same procedures as those in Example 1 except that either SAYTEX 8010 or ATOX-S was not added in contrast to the procedures in Example 1 in which 20.0 parts by weight of SAYTEX 8010 and 6.7 parts by weight of ATOX-S were added.

The results are shown in Table 1.

COMPARATIVE EXAMPLE 2

A resin composition was prepared, molded, and evaluated in accordance with the same procedures as those in Example 1 except that 4 parts by weight of SAYTEX 8010 and 20 parts by weight of ATOX-S were added in place of 20.0 parts by weight of SAYTEX 8010 and 6.7 parts by weight of ATOX-S.

The results are shown in Table 1.

COMPARATIVE EXAMPLE 3

A resin composition was prepared, molded, and evaluated in accordance with the same procedures as those in Example 1 except that 53.2 parts by weight of SAYTEX 8010 and 4 parts by weight of ATOX-S were added in place of 20.0 parts by weight of SAYTEX 8010 and 6.7 parts by weight of ATOX-S.

The results are shown in Table 1.

As can be understood from the above results, the flame retarding property and the mechanical properties of the obtained compositions were inferior when the relative amounts of SAYTEX 8010 as the name retardant and ATOX-S as the auxiliary flame retardant were not within the specified range.

COMPARATIVE EXAMPLE 4

A resin composition was prepared, molded, and evaluated in accordance with the same procedures as those in Example 1 except that 32.2 parts by weight of FIRE GUARD 7000 and 6.4 parts by weight of ATOX-S were added in place of 20.0 parts by weight of SAYTEX 8010 and 6.7 parts by weight of ATOX-S.

The results are shown in Table 1.

FIRE GUARD 7000 in an amount of 32.2 parts by weight contained the same amount of bromine as that in 20.0 parts by weight of SAYTEX 8010 which was added as the flame retardant in Example 1 (16.4 parts by weight of bromine based on 100 parts by weight of SPS).

COMPARATIVE EXAMPLE 5

A resin composition was prepared, molded, and evaluated in accordance with the same procedures as those in Example 1 except that 24.5 parts by weight of PYRO-CHEK 68PBC and 4.9 parts by weight of ATOX-S were added in place of 20.0 parts by weight of SAYTEX 8010 and 6.7 parts by weight of ATOX-S.

The results are shown in Table 1.

As can be understood from the above results, when the compounds other than the specific compounds were added as the flame retardant, the obtained compositions had inferior mechanical properties and heat stability during the heat molding, and sometimes the flame retarding property also deteriorated.

TABLE 1

| Example | 1 | 2 | 3 | | | | | |
|---|---|---|---|---|---|---|---|---|
| Comparative Example | | | | 1 | 2 | 3 | 4 | 5 |
| component B | | | | | | | | |
| SAYTEX 8010 (part by wt.) | 20.0 | 20.0 | 20.0 | 0 | 4 | 53.2 | | |
| FIRE GUARD 7000 (part by wt.) | | | | | | | 32.2 | |
| PYRO-CHEK 68PBC (part by wt.) | | | | | | | | 24.5 |
| PO-64P (part by wt.) | | | | | | | | |
| component C | | | | | | | | |
| antimony trioxide (part by wt.) | 6.7 | 4.0 | 6.7 | 0 | 20 | 4 | 6.4 | 4.9 |
| ratio by wt. of components B/C | 3.0 | 5.0 | 3.0 | 0 | 0.2 | 13.3 | 5.0 | 5.0 |
| compound analogous to hydrotalcite (part by wt.) | | | 1.0 | | | | | |
| mechanical strength | | | | | | | | |

TABLE 1-continued

| Example | 1 | 2 | 3 | | | | | |
|---|---|---|---|---|---|---|---|---|
| Comparative Example | | | | 1 | 2 | 3 | 4 | 5 |
| bending strength (MPa) | 69 | 68 | 70 | 51 | 53 | 49 | 42 | 67 |
| bending modulus (MPa) | 3720 | 3700 | 3710 | 3720 | 3970 | 4220 | 3140 | 3560 |
| Izod impact strength (kJ/m$^2$) | 1.8 | 1.9 | 1.8 | 1.0 | 0.8 | 0.5 | 0.6 | 1.1 |
| heat deformation temperature (° C.); load, 0.45 MPa | 170 | 168 | 171 | 151 | 169 | 179 | 127 | 150 |
| retention stability | | | | | | | | |
| MI*$^1$ | | | | | | | | |
| cooling time 20 sec (g/10 min) | 51 | 52 | 46 | 48 | 48 | 44 | 32 | 45 |
| cooling time 300 sec (g-10 min) | 55 | 56 | 48 | 49 | 51 | 48 | 68 | 61 |
| MI (300 sec)/MI (20 sec) | 1.08 | 1.08 | 1.04 | 1.02 | 1.06 | 1.09 | 2.13 | 1.36 |
| change in color of molded article*$^2$ | ○ | ○ | ⊙ | ⊙ | ○ | ○ | x | Δ |
| burning and foreign substances*$^2$ | none | none | none | none | none | none | found | none |
| flammability (UL-94) | V-2 | V-2 | V-2 | HB | V-2 | V-2 | V-2 | V-2 |

*$^1$: load, 0.21 MPa; test temperature, 290° C.
*$^2$: evaluated by visual observation The used amounts in Table 1 are shown in terms of part by weight based on 100 parts by weight of mixture A described above.

EXAMPLE 4

To 100 parts by weight of mixture B which contained 87% by weight of SPS obtained in Preparation Example 1, 3% by weight of polyphenylene ether modified with maleic anhydride obtained in Preparation Example 2, and 10% by weight of SEBS (a product of Shell Chemical Company; Crayton G-1651), 26.0 parts by weight of SAYTEX 8010 as the flame retardant and 6.5 parts by weight of ATOX-S as the auxiliary flame retardant were added. The obtained mixture was dry blended by using a Henschel mixer and then melt kneaded by using a twin screw extruder (a product of Toshiba Kikai Co., Ltd.; TEM-35) at a set cylinder temperature of 290° C. while 30% by weight (54.3 parts by weight based on 100 parts by weight of mixture B) of glass fiber (a product of Asahi Fiber Co., Ltd.; 03JAFT712) was side fed. The obtained mixture was pelletized.

From the obtained pellets, test pieces were prepared by using an injection molding machine (a product of Toshiba Kikai Co., Ltd.; IS55FPA) at a cylinder temperature of 300° C., an injection time of 10 seconds, and a cooling time of 20 seconds and evaluated with respect to bending strength, bending modulus, Izod impact strength, heat deformation temperature, MI, and flammability. After the retention test of the resin composition, the molded article was evaluated with respect to MI, change in color, burning, and foreign substances.

The results are shown in Table 2.

EXAMPLE 5

To 100 parts by weight of mixture C which contained 87% by weight of SPS obtained in Preparation Example 1, 3% by weight of polyphenylene ether modified with fumaric acid obtained in Preparation Example 3, and 10% by weight of SEBS (a product of Shell Chemical Company; Crayton G-1651), 26.0 parts by weight of SAYTEX 8010 as the flame retardant and 6.5 parts by weight of ATOX-S as the auxiliary flame retardant were added. The obtained mixture was dry blended by using a Henschel mixer and then melt kneaded by using a twin screw extruder (a product of Toshiba Kikai Co., Ltd.; TEM-35) at a set cylinder temperature of 290° C. while 30% by weight (54.3 parts by weight based on 100 parts by weight of mixture C) of glass fiber (a product of Asahi Fiber Co., Ltd.; 03JAFT712) was side fed. The obtained mixture was pelletized.

From the obtained pellets, test pieces were prepared by using an injection molding machine (a product of Toshiba Kikai Co., Ltd.; IS55FPA) at a cylinder temperature of 300° C., an injection time of 10 seconds, and a cooling time of 20 seconds and evaluated with respect to bending strength, bending modulus, Izod impact strength, heat deformation temperature, MI, and flammability. After the retention test of the resin composition, the molded article was evaluated with respect to MI, change in color, burning, and foreign substances.

The results are shown in Table 2.

EXAMPLE 6

A resin composition was prepared, molded, and evaluated in accordance with the same procedures as those in Example 4 except that 20.0 parts by weight of SAYTEX 8010 and 4.0 parts by weight of ATOX-S were added in place of 26.0 parts by weight of SAYTEX 8010 and 6.7 parts by weight of ATOX-S.

The results are shown in Table 2.

As can be understood from the above results, resin compositions having excellent flame retarding property, mechanical properties, and heat stability during heat molding could be obtained by addition of the specific relative amounts of SAYTEX 8010 as the flame retardant and ATOX-S as the auxiliary flame retardant.

EXAMPLE 7

A resin composition was prepared, molded, and evaluated in accordance with the same procedures as those in Example 4 except that 1.0 part by weight of a compound analogous to hydrotalcite (a product of Kyowa Hakko Kagaku Co., Ltd.; DHT-4A), 0.1 part by weight of IRGANOX 1010 (a product of Ciba Geigy Company), and 0.1 part by weight of ADEKASTAB PEP-36 (a product of Asahi Denka Kogyo Co., Ltd.) as the antioxidants, and 0.5 parts by weight of ADEKASTAB NA-11 (a product of Asahi Denka Kogyo Co., Ltd.) as the nucleating agent were additionally used.

The results are shown in Table 2.

As can be understood from the above results, a resin composition having still more excellent heat stability during heat molding could be obtained by the additional use of DHT4A and the antioxidants.

COMPARATIVE EXAMPLE 6

A resin composition was prepared, molded, and evaluated in accordance with the same procedures as those in Example 4 except that 4.0 parts by weight of SAYTEX 8010 and 2.0 parts by weight of ATOX-S was added in place of 26.0 parts by weight of SAYTEX 8010 and 6.7 parts by weight of ATOX-S.

The results are shown in Table 2.

COMPARATIVE EXAMPLE 7

A resin composition was prepared, molded, and evaluated in accordance with the same procedures as those in Example 4 except that 53.2 parts by weight of SAYTEX 8010 and 4.0 parts by weight of ATOX-S were added in place of 26.0 parts by weight of SAYTEX 8010 and 6.7 parts by weight of ATOX-S.

The results are shown in Table 2.

As can be understood from the above results, the flame retarding property and the mechanical properties of the obtained composition were inferior when the relative amounts of SAYTEX 8010 as the flame retardant and ATOX-S as the auxiliary flame retardant were not within the specified range.

COMPARATIVE EXAMPLE 8

A resin composition was prepared, molded, and evaluated in accordance with the same procedures as those in Example 6 except that 24.5 parts by weight of PYRO-CHEK 68PBC and 4.9 parts by weight of ATOX-S were added in place of 26.0 parts by weight of SAYTEX 8010 and 6.7 parts by weight of ATOX-S.

The results are shown in Table 2.

PYRO-CHEK 68PBC in an amount of 24.5 parts by weight contained the same amount of bromine as that in 20.0 parts by weight of SAYTEX 8010 which was added as the flame retardant in Example 6 (16.4 parts by weight of bromine based on 100 parts by weight of SPS).

COMPARATIVE EXAMPLE 9

A resin composition was prepared, molded, and evaluated in accordance with the same procedures as those in Example 4 except that 26.5 parts by weight of PO-64P and 5.3 parts by weight of ATOX-S were added in place of 26.0 parts by weight of SAYTEX 8010 and 6.7 parts by weight of ATOX-S.

The results are shown in Table 2.

As can be understood from the above results, when the compounds other than the specific compounds were added as the flame retardant, the obtained compositions had inferior mechanical properties and heat stability during the heat molding, and sometimes the flame retarding property also deteriorated.

TABLE 2

| Example | 4 | 5 | 6 | 7 | | | | |
|---|---|---|---|---|---|---|---|---|
| Comparative Example | | | | | 6 | 7 | 8 | 9 |
| component B | | | | | | | | |
| SAYTEX 8010 (part by wt.) | 26.0 | 26.0 | 20.0 | 26.0 | 4.0 | 53.2 | | |
| FIRE GUARD 7000 (part by wt.) | | | | | | | | |
| PYRO-CHEK 68PBC (part by wt.) | | | | | | | 24.5 | |
| PO-64P (part by wt.) | | | | | | | | 26.5 |
| component C | | | | | | | | |
| antimony trioxide (part by wt.) | 6.5 | 6.5 | 4.0 | 6.5 | 20.0 | 4.0 | 49 | 5.3 |
| ratio by wt. of components B/C | 4.0 | 4.0 | 5.0 | 4.0 | 0.2 | 13.3 | 5.0 | 5.0 |
| component D | | | | | | | | |
| inorganic filler (part by wt.) | 54.3 | 54.3 | 54.3 | 54.3 | 54.3 | 54.3 | 54.3 | 54.3 |
| compound analogous to hydrotalcite (part by wt.) | | | | 1.0 | | | | |
| mechanical strength | | | | | | | | |
| bending strength (MPa) | 165 | 167 | 170 | 168 | 155 | 121 | 142 | 145 |
| bending modulus (MPa) | 8970 | 8890 | 8700 | 8895 | 9130 | 9010 | 8710 | 8630 |
| Izod impact strength (kJ/m$^2$) | 9.0 | 8.9 | 9.0 | 9.1 | 7.5 | 7.2 | 6.5 | 6.7 |
| heat deformation temperature (° C.); load, 0.45 MPa | 250 | 251 | 249 | 250 | 253 | 249 | 237 | 233 |
| retention stability | | | | | | | | |
| MI*$^1$ | | | | | | | | |
| cooling time 20 sec (g/10 min) | 15 | 14 | 15 | 13 | 11 | 9 | 10 | 12 |
| cooling time 300 sec (g-10 min) | 19 | 17 | 18 | 15 | 15 | 13 | 22 | 21 |
| MI (300 sec)/MI (20 sec) | 1.27 | 1.21 | 1.20 | 1.15 | 1.36 | 1.44 | 2.20 | 1.75 |
| change in color of molded article*$^2$ | ○ | ○ | ○ | ⊚ | ○ | ○ | Δ | Δ |
| burning and foreign substances*$^2$ | none | none | none | none | none | none | none | found |
| flammability (UL-94) | V-0 | V-0 | V-2 | V-0 | HB | V-0 | V-0 | V-0 |

*$^1$: load, 0.21 MPa; test temperature, 290° C.
*$^2$: evaluated by visual observation The used amounts in Table 2 are shown in terms of part by weight based on 100 parts by weight of mixture B or C described above.

EXAMPLE 8

To 100 parts by weight of mixture D which contained 97% by weight of SPS obtained in Preparation Example 1 and 3% by weight of polyphenylene ether modified with maleic anhydride obtained in Preparation Example 2, 10 parts by weight of SAYTEX 8010 as the flame retardant and 2 parts by weight of ATOX-S as the auxiliary flame retardant were added. The obtained mixture was dry blended by using a Henschel mixer and then melt kneaded by using a twin screw extruder (a product of Toshiba Kikai Co., Ltd.; TEM-35) at a set cylinder temperature of 290° C. while 30% by weight (54.3 parts by weight based on 100 parts by weight of mixture D) of glass fiber (a product of Asahi Fiber Co., Ltd.; 03JAFT712) was side fed. The obtained mixture was pelletized.

From the obtained pellets, test pieces were prepared by using an injection molding machine (a product of Toshiba Kikai Co., Ltd.; IS55FPA) at a cylinder temperature of 300° C., an injection time of 10 seconds, and a cooling time of 20 seconds and evaluated with respect to bending strength, bending modulus, Izod impact strength, heat deformation temperature, MI, and flammability. After the retention test of the resin composition, the molded article was evaluated with respect to MI, change in color, burning, and foreign substances.

The results are shown in Table 3.

EXAMPLE 9

To 100 parts by weight of mixture E which contained 45% by weight of SPS obtained in Preparation Example 1, 5% by weight of polyphenylene ether modified with maleic anhydride obtained in Preparation Example 2, and 50% by weigh of nylon-66 (a product of Ube Kosan Co., Ltd.; 2020B), 15 parts by weight of SAYTEX 8010 as the flame retardant and 3.8 parts by weight of ATOX-S as the auxiliary flame retardant were added. The obtained mixture was dry blended by using a Henschel mixer and then melt kneaded by using a twin screw extruder (a product of Toshiba Kikai Co., Ltd.; TEM-35) at a set cylinder temperature of 290° C. while 30% by weight (54.3 parts by weight based on 100 parts by weight of mixture E) of glass fiber (a product of Asahi Fiber Co., Ltd.; 03JAFT712) was side fed. The obtained mixture was pelletized.

From the obtained pellets, test pieces were prepared by using an injection molding machine (a product of Toshiba Kikai Co., Ltd.; IS55FPA) at a cylinder temperature of 300° C., an injection time of 10 seconds, and a cooling time of 20 seconds and evaluated with respect to bending strength, bending modulus, Izod impact strength, heat deformation temperature, MI, and flammability. After the retention test of the resin composition, the molded article was evaluated with respect to MI, change in color, burning, and foreign substances.

The results are shown in Table 3.

EXAMPLE 10

To 100 parts by weight of mixture B which contained 87% by weight of SPS obtained in Preparation Example 1, 3% by weight of polyphenylene ether modified with maleic anhydride obtained in Preparation Example 2, and 10% by weight of SEBS (a product of Shell Chemical Company; Crayton G-1651), 26 parts by weight of SAYTEX 8010 as the flame retardant and 6.5 parts by weight of ATOX-S as the auxiliary flame retardant were added. The obtained mixture was dry blended by using a Henschel mixer and then melt kneaded by using a twin screw extruder (a product of Toshiba Kikai Co., Ltd.; TEM-35) at a set cylinder temperature of 290° C. while 60% by weight (108.6 parts by weight based on 100 parts by weight of mixture B) of silica (a product of Denki Kagaku Kogyo Co., Ltd.; FS784) was side fed. The obtained mixture was pelletized.

From the obtained pellets, test pieces were prepared by using an injection molding machine (a product of Toshiba Kikai Co., Ltd.; IS55FPA) at a cylinder temperature of 300° C., an injection time of 10 seconds, and a cooling time of 20 seconds and evaluated with respect to bending strength, bending modulus, Izod impact strength, heat deformation temperature, MI, and flammability. After the retention test of the resin composition, the molded article was evaluated with respect to MI, change in color, burning, and foreign substances.

The results are shown in Table 3.

TABLE 3

| Example | 8 | 9 | 10 |
|---|---|---|---|
| component B | | | |
| SAYTEX 8010 (part by wt.) | 10 | 15 | 26 |
| FIRE GUARD 7000 (part by wt.) | | | |
| PYRO-CHEK 68PBC (part by wt.) | | | |
| PO-64P (part by wt.) | | | |
| component C | | | |
| antimony trioxide (part by wt.) | 2 | 3.8 | 6.5 |
| ratio by wt. of components B/C | 5.0 | 4.0 | 4.0 |
| component D | | | |
| inorganic filler (part by wt.) | 54.3 | 54.3 | 108.6 |
| compound analogous to hydrotalcite (part by wt.) | | | |
| mechanical strength | | | |
| bending strength (MPa) | 151 | 204 | 43 |
| bending modulus (MPa) | 9500 | 8970 | 4820 |
| Izod impact strength (kJ/m$^2$) | 6.0 | 8.1 | 5.3 |
| heat deformation temperature (° C.); load, 0.45 MPa | 265 | 239 | 235 |
| retention stability | | | |
| MI*$^1$ | | | |
| cooling time 20 sec (g/10 min) | 25 | 40 | 9 |
| cooling time 300 sec (g-10 min) | 27 | 49 | 10 |
| MI (300 sec)/MI (20 sec) | 1.08 | 1.23 | 1.11 |
| change in color of molded article*$^2$ | ○ | ○ | ○ |
| burning and foreign substances*$^2$ | none | none | none |
| flammability (UL-94) | V-0 | V-0 | V-0 |

*$^1$: load, 0.21 MPa; test temperature, 290° C.
*$^2$: evaluated by visual observation The used amounts in Table 3 are shown in terms of part by weight based on 100 parts by weight of mixture B, D, or E described above.

What is claimed is:

1. A flame retarded polystyrenic resin composition comprising: (A) 100 parts by weight of a resin which comprises (a-1) 1 to 100% by weight of a styrenic polymer having the syndiotactic configuration, (a-2) 0 to 10% by weight of a polymer having compatibility or affinity with component (a-1) and having a polar group, and (a-3) 0 to 99% by weight of a thermoplastic resin and/or a rubbery elastomer other than components (a-1) and (a-2); (B) 2 to 100 parts by weight of a brominated diphenyl compound represented by the following general formula (1):

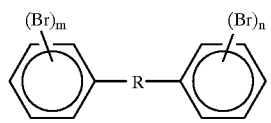

(1)

[wherein m and n represent each an integer of 3 to 5, and R represents an alkylene group having 1 to 5 carbon atoms]; and (C) 0.5 to 50 parts by weight of at least one compound selected from antimony oxides, sodium antimonate, iron oxides, and zinc oxide; the ratio by weight of component (B) to component (C) being in the range of 1 to 10.

2. A flame retarded polystyrenic resin composition comprising: (A) 100 parts by weight of a resin which comprises (a-1) 1 to 100% by weight of a styrenic polymer having the syndiotactic configuration, (a-2) 0 to 10% by weight of a polymer having compatibility or affinity with component (a-1) and having a polar group, and (a-3) 0 to 99% by weight of a thermoplastic resin and/or a rubbery elastomer other than components (a-1) and (a-2); (B) 2 to 100 parts by weight of a brominated diphenyl compound represented by the following general formula (1):

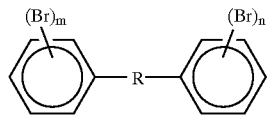

(1)

[wherein m and n represent each an integer of 3 to 5, and R represents an alkylene group having 1 to 5 carbon atoms]; (C) 0.5 to 50 parts by weight of at least one compound selected from antimony oxides, sodium antimonate, iron oxides, and zinc oxide; and (D) 1 to 500 parts by weight of an inorganic filler; the ratio by weight of component (B) to component (C) being in the range of 1 to 10.

3. A flame retarded polystyrenic resin composition according to claim 1 wherein the brominated diphenyl compound of component (B) is a compound selected from di(pentabromophenyl)methane, di(tetrabromophenyl)methane, di(tribromophenyl)methane, 1,2-di(pentabromophenyl)ethane, 1,2-di(tetrabromophenyl)ethane, and 1,2-di(tribromophenyl)ethane.

4. A flame retarded polystyrenic resin composition according to claim 1 wherein the compound selected from antimony oxides, sodium antimonate, iron oxides, and zinc oxide has an average particle diameter in the range of 0.01 to 10 $\mu$m.

5. A molded article of a polystyrenic resin prepared by using the flame retarded polystyrenic resin composition described in claim 1 as a material.

6. A molded article of a polystyrenic resin prepared by using the flame retarded polystyrenic resin composition described in claim 2 as a material.

* * * * *